(12) United States Patent
Gordon et al.

(10) Patent No.: US 11,593,934 B2
(45) Date of Patent: Feb. 28, 2023

(54) SPECIMEN PROCESSING SYSTEMS AND RELATED METHODS

(71) Applicant: CooperSurgical, Inc., Trumbull, CT (US)

(72) Inventors: Joseph Gordon, Mansfield, MA (US); John Glaberson, Sandy Hook, CT (US); Tara Pratap Ebsworth, Weston, MA (US); Patrick N. Gutelius, Monroe, CT (US)

(73) Assignee: CooperSurgical, Inc., Trumbull, CT (US)

( * ) Notice: Subject to any disclaimer, the term of this patent is extended or adjusted under 35 U.S.C. 154(b) by 456 days.

(21) Appl. No.: 16/910,442

(22) Filed: Jun. 24, 2020

(65) Prior Publication Data

US 2021/0065363 A1  Mar. 4, 2021

Related U.S. Application Data

(60) Provisional application No. 62/894,202, filed on Aug. 30, 2019.

(51) Int. Cl.
*A61K 35/12* (2015.01)
*G06K 9/00* (2022.01)
(Continued)

(52) U.S. Cl.
CPC ......... *G06T 7/0012* (2013.01); *G01N 1/4077* (2013.01); *G01N 1/42* (2013.01);
(Continued)

(58) Field of Classification Search
CPC ............. A61K 35/12; G06K 9/00; A01N 1/02
(Continued)

(56) References Cited

U.S. PATENT DOCUMENTS 8,633,023 B2 * 1/2014 Du ................. A01N 1/0278
435/325
9,538,745 B2 * 1/2017 He ..................... A01N 1/02
(Continued)

FOREIGN PATENT DOCUMENTS

WO   WO 2011/070973   6/2011   .............. C12M 1/00
WO   WO 2014/001819   1/2014   ............... B01L 3/00
(Continued)

OTHER PUBLICATIONS

Campos-Chillon et al., "In vitro assessment of a direct transfer vitrification procedure for bovine embryos", *Theriogenology*, vol. 65, No. 6, pp. 1200-1214 (Apr. 1, 2006).
(Continued)

*Primary Examiner* — Seyed H Azarian
(74) *Attorney, Agent, or Firm* — Fish & Richardson P.C.

(57) ABSTRACT

A specimen processing system includes a plate for supporting a specimen system, wherein the specimen system includes a container and a specimen contained therein. The specimen processing system further includes a camera disposed above the plate and configured to generate images of the specimen system, a light source disposed beneath the plate for radiating light towards the plate, a light stop for blocking a portion of the light from reaching the specimen system to produce darkfield illumination of the specimen at the camera, and one or more processors electronically coupled to the camera and configured to track a position of the specimen within the specimen container during a specimen processing protocol based on the images.

34 Claims, 15 Drawing Sheets

(51) Int. Cl.

| | | |
|---|---|---|
| *G06T 7/00* | (2017.01) | |
| *G06T 7/70* | (2017.01) | |
| *G01N 1/40* | (2006.01) | |
| *G01N 1/42* | (2006.01) | |
| *G01N 21/85* | (2006.01) | |
| *G01N 35/00* | (2006.01) | |
| *G06T 5/00* | (2006.01) | |
| *G06T 7/20* | (2017.01) | |
| *H04N 5/225* | (2006.01) | |

(52) U.S. Cl.
CPC ....... *G01N 21/85* (2013.01); *G01N 35/00732* (2013.01); *G06T 5/002* (2013.01); *G06T 7/20* (2013.01); *G06T 7/70* (2017.01); *H04N 5/2253* (2013.01); *H04N 5/2254* (2013.01); *H04N 5/2256* (2013.01); *G01N 2001/4083* (2013.01); *G01N 2201/062* (2013.01); *G06T 2207/30024* (2013.01)

(58) Field of Classification Search
USPC ....... 382/100, 103, 106, 128–134, 155, 162, 382/168, 173, 181, 190, 199, 209, 219, 382/224, 232, 254, 276, 286–291, 274, 382/305, 321; 435/286.2, 29, 325
See application file for complete search history.

(56) References Cited

U.S. PATENT DOCUMENTS

| | | | |
|---|---|---|---|
| 9,723,831 B2* | 8/2017 | Sun | G02B 21/365 |
| 2007/0037271 A1 | 2/2007 | Huang et al. | |
| 2010/0311036 A1 | 12/2010 | He | |
| 2011/0105834 A1* | 5/2011 | Wong | G16B 45/00 |
| | | | 435/29 |
| 2011/0129811 A1 | 6/2011 | Tao | |
| 2011/0196358 A1 | 8/2011 | Criado Scholz | |
| 2014/0106389 A1* | 4/2014 | Loewke | G01N 35/00584 |
| | | | 435/286.2 |
| 2014/0342454 A1 | 11/2014 | Burbank et al. | |
| 2016/0102286 A1 | 4/2016 | Toner et al. | |
| 2017/0089820 A1* | 3/2017 | Wong | C12Q 1/02 |
| 2018/0002649 A1 | 1/2018 | Pedersen | |
| 2019/0162639 A1* | 5/2019 | Gutelius | G01N 1/42 |

FOREIGN PATENT DOCUMENTS

| | | | |
|---|---|---|---|
| WO | WO 2017/109153 | 6/2017 | ............ B01L 3/00 |
| WO | WO 2017/122210 | 7/2017 | ............ A01N 1/02 |

OTHER PUBLICATIONS

*FertileSAFE, Where Fertifility and Cryopreservation Meet*, https://www.fertilesafe.com/sarah_(2015).

Miri TL Time-Lapse Incubator for IVF, at this link: http://medical.escoglobal.com/images/product-pdf/9010338-MIRI-TL-Combined-Catalogue-A4-vA.pdf . Retrieved on Dec. 13, 2018.

*New IVF Products to unveil!*, http://medical.escoglobal.com/news/new-ivf-products-to-unveil-at-eshre-2016/71/en/_(2016).

Payne, "Efficiency of two cryopreservation methods using direct in-straw rehydration after repeated vitrification of mouse embryos", *A Senior Project presented to the Faculty of the Animal Science Department*, College of Agriculture California Polvtecchnic State University, San Luis Obispo (Jun. 2012).

Photo of an automatic vitrification machine developed by Esco Medical and demonstrated at the European Society of Human Reproduction and Embryology meeting on Jul. 4, 2017 in Geneva, Switzerland.

Photos of an automatic vitrification machine developed by Esco Medical and demonstrated at the American Society of Reproductive Medicine Scientific Congress & Expo on Oct. 6, 2018 in Denver, Colorado.

Yasushi et al., "In-straw Cryoprotectant Dilution for Bovine Embryos Vitrified Using Cryotop", *Journal of Reproduction and Development*, vol. 57, No. 4, pp. 437-443 (Apr. 5, 2011).

International Preliminary Report on Patentability for International Application No. PCT/US2020/039306, dated Mar. 10, 2022.

International Search Report and Written Opinion of the International Searching Authority for International Application No. PCT/US2020/039306, dated Sep. 2, 2020.

* cited by examiner

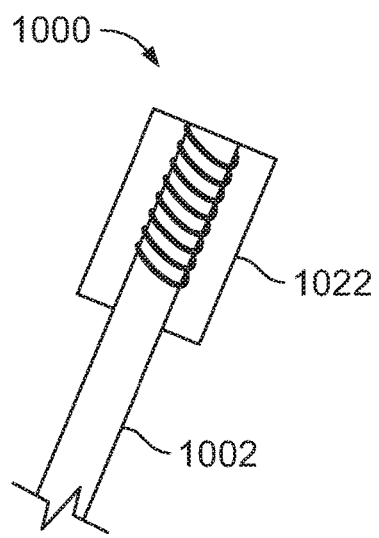
FIG. 6
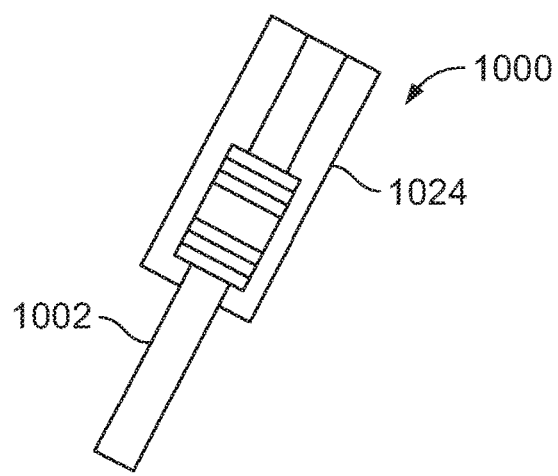 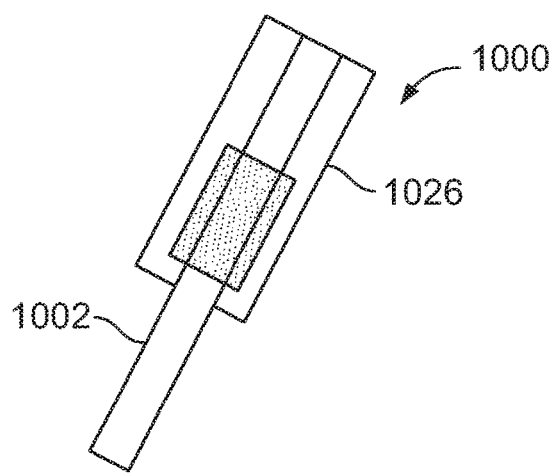
FIG. 7  FIG. 8

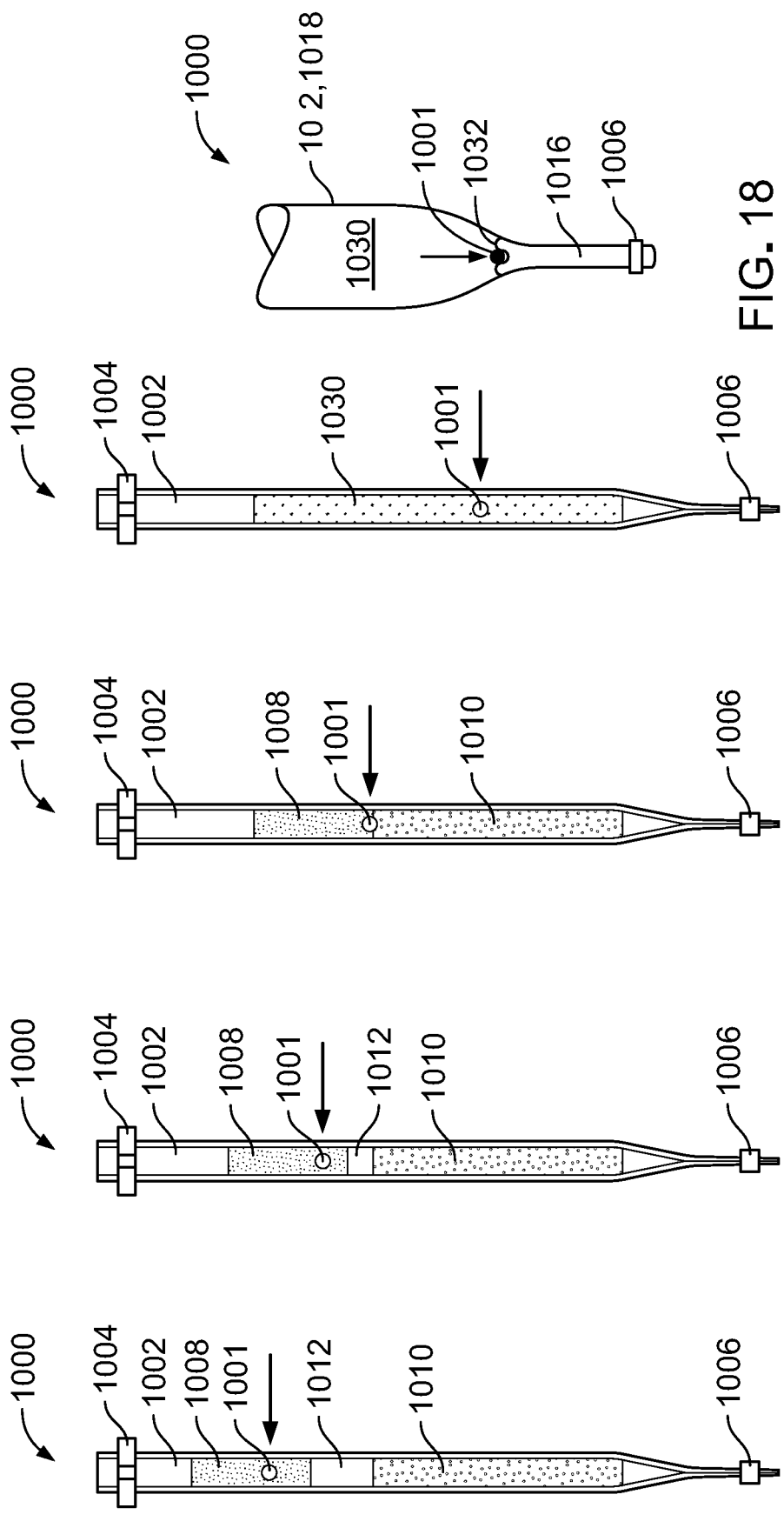

SPECIMEN PROCESSING SYSTEMS AND RELATED METHODS

CROSS REFERENCE TO RELATED APPLICATIONS

This application claims the benefit of prior U.S. Provisional Application No. 62/894,202, filed on Aug. 30, 2019, which is incorporated herein by reference in its entirety.

TECHNICAL FIELD

This disclosure relates to specimen processing systems, such as automated vitrification systems, and methods of tracking a position of a specimen within a specimen container undergoing a specimen processing protocol at such specimen processing systems.

BACKGROUND

Cryopreservation containers are used in the field of assisted reproductive technology (ART) to store and preserve living reproductive specimens (e.g., oocytes, embryos, and blastocysts). Cryopreservation refers to a process in which specimens are preserved over extended periods of time by cooling to sub-zero temperatures. For example, a cryopreservation container can house and support specimens undergoing vitrification, which is the rapid transition of a substance from a liquid phase to a solid phase (e.g., glass) without the formation of ice crystals within cells of the specimen. Typical protocols for vitrifying a reproductive specimen include exposing the specimen to multiple processing solutions according to a detailed vitrification protocol, subsequently transferring the specimen to a cryopreservation container, and then exposing the cryopreservation container, containing the specimen therein, to a low temperature cooling medium (e.g., liquid nitrogen) to cause the cells of the specimen to rapidly cool to a glass state before ice crystals can form within the cells. The cryopreservation container can be stored in the cooling medium until the specimen is ready to be used in reproductive procedures.

SUMMARY

In general, this disclosure relates to specimen processing systems that can be used to prepare a biological specimen for cryopreservation within a specimen container according to a specimen processing protocol (e.g., a vitrification protocol) in an automated manner.

In one aspect, a specimen processing system includes a plate for supporting a specimen system, wherein the specimen system includes a container and a specimen contained therein. The specimen processing system further includes a camera disposed above the plate and configured to generate images of the specimen system, a light source disposed beneath the plate for radiating light towards the plate, a light stop for blocking a portion of the light from reaching the specimen system to produce darkfield illumination of the specimen at the camera, and one or more processors electronically coupled to the camera and configured to track a position of the specimen within the specimen container during a specimen processing protocol based on the images.

Embodiments may include one or more of the following features.

In some embodiments, the specimen processing system further includes an adjustable lens for focusing the light onto the specimen system.

In some embodiments, the specimen processing system further includes a processing station that locates the camera.

In some embodiments, the processing station defines a receptacle adjacent the plate for positioning the specimen container.

In some embodiments, the processing station includes a mount for selectively positioning the camera at the processing station.

In some embodiments, the specimen processing system further includes a rotatable platform to which the processing station is secured for applying a centripetal force to the specimen to cause the specimen to move within the specimen container.

In some embodiments, the one or more processors are further configured to convert the images from color to greyscale.

In some embodiments, the one or more processors are further configured to remove noise from the images.

In some embodiments, the one or more processors are further configured to detect an object corresponding to the specimen in the images.

In some embodiments, the one or more processors are further configured to determine parameters including one or more of a position, a speed, and a direction of the specimen as the specimen moves within the specimen container.

In some embodiments, the one or more processors are configured to output one or more of the parameters.

In some embodiments, the specimen processing system further includes a motor that can adjust movement of the rotatable platform based on one or more of the parameters.

In some embodiments, the light stop is arranged to block the portion of the light from reaching a central axis of the specimen container such that edges of the specimen remain visible to produce darkfield illumination at the camera.

In some embodiments, the light source includes multiple light-emitting diodes.

In some embodiments, the camera is configured to scan an identification label of the specimen container.

In some embodiments, the one or more processors are configured to track respective positions of multiple specimens within the specimen container based on the images during the specimen processing protocol.

In some embodiments, the specimen processing system further includes a vibration assembly configured to direct movement of the specimen within the specimen container during the specimen processing protocol.

In some embodiments, the specimen processing system further includes a cutting station configured to cut and release a distal portion of the specimen container with the specimen contained therein following completion of the specimen processing protocol.

In some embodiments, the specimen is a reproductive specimen.

In some embodiments, the specimen processing protocol includes a vitrification protocol.

In another aspect, a method of processing a specimen within a specimen container includes generating images of the specimen within the specimen container at a camera disposed above a plate supporting the specimen container, directing light towards the plate from a light source disposed beneath the plate, blocking a portion of the light from reaching the specimen with a light stop to produce darkfield illumination of the specimen at the camera, and tracking a position of the specimen within the specimen container based on the images at one or more processors in electronic communication with the camera during a specimen processing protocol.

Embodiments, may include one or more of the following features.

In some embodiments, the method further includes focusing the light onto the specimen at an adjustable lens.

In some embodiments, the method further includes locating the camera at a processing station.

In some embodiments, the method further includes positioning the specimen container within a receptacle of the processing station that is adjacent the plate.

In some embodiments, the method further includes selectively positioning a mount supporting the camera at the processing station.

In some embodiments, the method further includes applying a centripetal force to the specimen to cause the specimen to move within the specimen container by rotating a platform to which the processing station is secured.

In some embodiments, the method further includes converting the images from color to greyscale at the one or more processors.

In some embodiments, the method further includes removing noise from the images at the one or more processors.

In some embodiments, the method further includes detecting an object corresponding to the specimen in the images at the one or more processors.

In some embodiments, the method further includes determining, at the one or more processors, parameters including one or more of a position, a speed, and a direction of the specimen as the specimen moves within the specimen container.

In some embodiments, the method further includes outputting one or more of the parameters from the one or more processors.

In some embodiments, the method further includes adjusting movement of the platform based on one or more of the parameters via a motor.

In some embodiments, the method further includes blocking the portion of the light from reaching a central axis of the specimen container such that edges of the specimen remain visible to produce darkfield illumination at the camera.

In some embodiments, the light source includes multiple light-emitting diodes.

In some embodiments, the method further includes scanning an identification label of the specimen container at the camera.

In some embodiments, the method further includes tracking respective positions of multiple specimens within the specimen container based on the images at the one or more processors during the specimen processing protocol.

In some embodiments, the method further includes directing movement of the specimen within the specimen container at vibration assembly during the specimen processing protocol.

In some embodiments, the method further includes cutting and releasing a distal portion of the specimen container, with the specimen contained therein, following completion of the specimen processing protocol at a cutting station.

In some embodiments, the specimen is a reproductive specimen.

In some embodiments, the specimen processing protocol includes a vitrification protocol.

Embodiments may provide one or more of the following advantages.

In some embodiments, the specimen processing system includes one or more processing stations that are configurable owing to multiple mounting and support components for particularly positioning the specimen container as desired. The specimen processing system also includes a microcontroller that can advantageously adjust a rotational speed of a platform on which the specimen container rotates and a duration of one or more phases of a specimen processing protocol based on feedback from a vision system.

For example, in some embodiments, a vision system located at each processing station is configured to provide darkfield illumination of the specimen for optimal visualization and tracking of the specimen during the specimen processing protocol. The configuration and functionality of the various components of the vision system for achieving dark field illumination advantageously allow for fine control and constraint of intensity, exposure time, and wavelength of light radiating from a light source to the specimen, which can be important to the survival of delicate biological specimens.

Furthermore, in some embodiments, a camera of the vision system can track a linear movement of the specimen throughout the specimen processing protocol in real time by continuously generating images of the specimen and feeding the images in a real-time video feed to a computing device running a software algorithm that processes the images to track a position of the specimen. Based on feedback from the software algorithm, the microcontroller advantageously can control the rotational speed, spin direction, and acceleration of the platform to ensure that the specimen is exposed to a substantially constant centripetal force as programmed by the user. Such protocol adjustments can optimize time periods of specimen exposure to the processing media.

DESCRIPTION OF DRAWINGS

FIG. 6 is a cross-sectional view of a proximal end region of the specimen container of FIG. 5, including an identification (ID) label provided as an RFID tag.

FIG. 7 is a cross-sectional view of a proximal end region of the specimen container of FIG. 5, including an ID label provided as a barcode tag.

FIG. 8 is a cross-sectional view of a proximal end region of the specimen container of FIG. 5, including an ID label provided as a QR code tag.

FIGS. 14-18 illustrate a series of movements of a specimen within the specimen container of FIG. 1 for processing the specimen according to a protocol carried out at the specimen processing system of FIG. 1.

DETAILED DESCRIPTION

Figure 1:
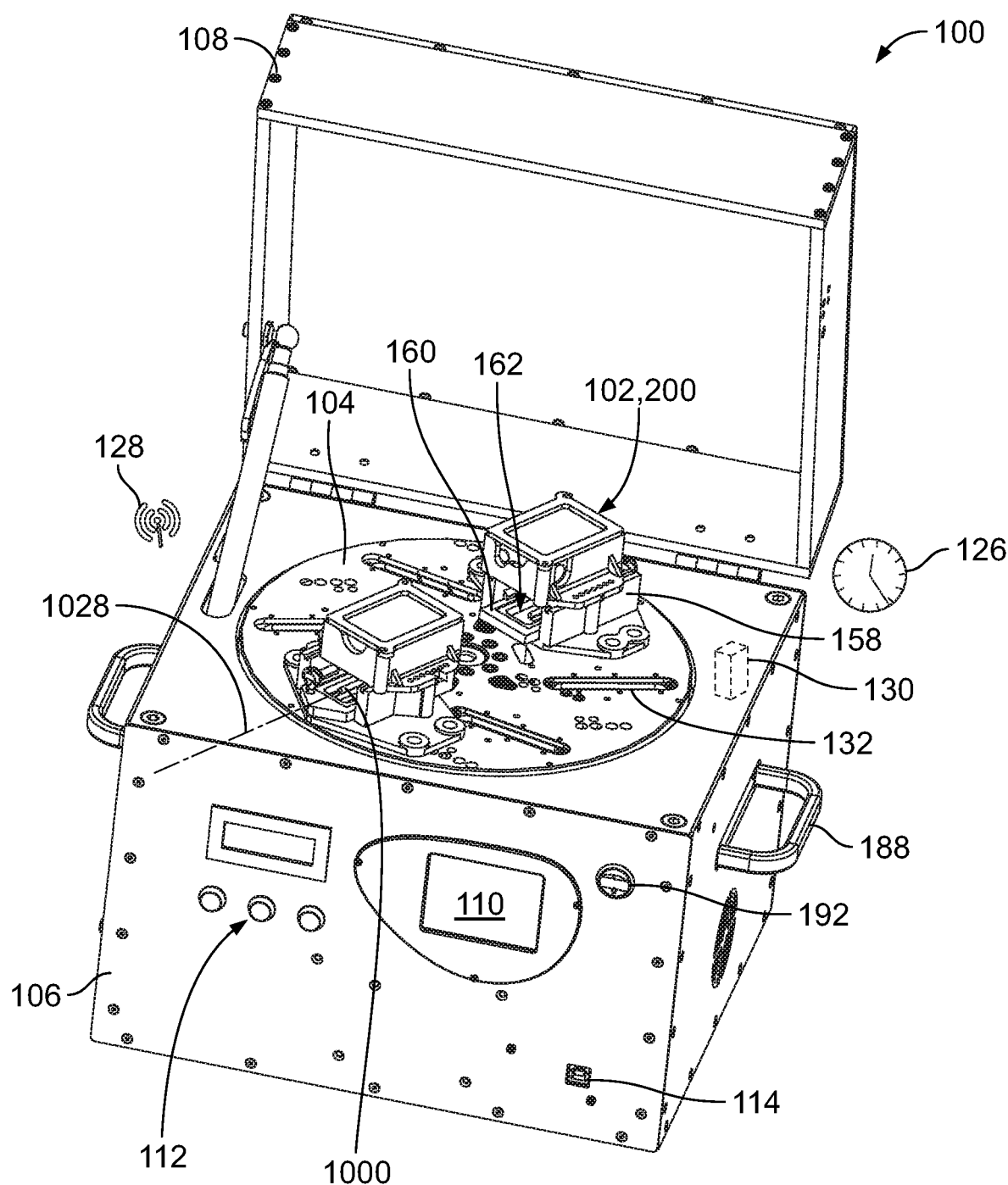
FIG. 1 is a front perspective view of a specimen processing system that can be used to prepare a specimen disposed within a specimen container.

FIGS. 1-4 illustrate various views of a specimen processing system 100 that can be used to prepare a biological specimen for cryopreservation within a specimen container 1000 according to a specimen processing protocol (e.g., a vitrification protocol) in an automated manner. Referring to FIG. 5, the specimen 1001 is disposed within the specimen container 1000, and the specimen container 1000 is designed for cryopreparation and cryopreservation of the specimen 1001 in a viable and vitrified state within a low temperature substance (e.g., liquid nitrogen, cryogenic plasma, or liquid helium) until the specimen 1001 is desired for use (e.g., over a period of up to about 30 years). The specimen 1001 may be a single cell, a collection of free (e.g., unattached) cells, or a collection of attached cells (e.g., a multicellular tissue). The specimen 1001 may be a reproductive specimen (e.g., a sperm cell, an oocyte, a zygote, a blastocyst, a gastrula, or an embryo) or a non-reproductive specimen (e.g., one or more T-cells or blood cells). The specimen 1001 may be a mammalian tissue sample or a non-mammalian tissue sample. In some examples, the specimen 1001 may be an agricultural specimen, such as canola. In other examples, the specimen 1001 may be a non-biological specimen, such as various chemicals or other non-biological specimens.

The specimen processing system 100 and the specimen container 1000 are together designed to exploit mass properties (e.g., density and fluid mechanics) of the specimen 1001 with respect to mass properties of various processing media. Accordingly, the specimen container 1000 is provided as an elongate tube 1002 that is internally preloaded with multiple fluids to which the specimen 1001 will be exposed during a cryopreservation process. In particular, the specimen 1001 can be moved in an axial direction 1003 within the specimen container 1000 by centrifugal forces acting on the specimen 1001 within the processing system 100, as will be discussed in more detail below.

The elongate tube 1002 is hermetically sealed at proximal and distal closures 1004, 1006. In some embodiments, the elongate tube 1002 is preloaded with an equilibration solution 1008 (e.g., a cryoprotectant of relatively low density) and a vitrification solution 1010 (e.g., a cryoprotectant of relatively high density) that are separated by a separation fluid 1012 (e.g., an air bubble or an immiscible media). Such separation of the equilibration solution 1008 and the vitrification solution 1010 enables appropriate processing of the specimen 1001 (e.g., sequential exposure of the specimen 1001 to particular solutions for desired periods of time) during a vitrification protocol. In some embodiments, the elongate tube 1002 is further preloaded with a proximal air pocket 1014 that separates the equilibration solution 1008 from the proximal closure 1004 and a distal air pocket 1016 (e.g., occupying a portion of an interior volume of a tapered portion 1018 of the elongate tube 1002) that separates the vitrification solution 1010 from the distal closure 1006.

The elongate tube 1002 is a thin capillary tube of very small diameter (e.g., having an internal diameter on the order of $10^{-4}$ m). The elongate tube 1002 has a substantially constant diameter along a main portion 1020 (e.g., a cylindrical portion) and has a variable diameter that gradually decreases along the tapered portion 1018. A lumen of the elongate tube 1002, at a smallest inner diameter, is large enough to accommodate a specimen 1001, which typically has a diameter or a width in a range of about 50 μm to about 150 μm. The specimen container 1000 typically has a total length of about 15 mm to about 260 mm (e.g., about 150 mm). The elongate tube 1002 is typically made of one or more materials that are transparent or translucent to allow viewing of the specimen 1001 contained within the elongate tube 1002 and that can withstand the low temperature substance. Example materials from which the elongate tube 1002 may be made include polymers such as polystyrene, polypropylene, polyvinyl acetate, and polycarbonate, and fluoropolymers.

Referring to FIGS. 6-8, the specimen container 1000 further includes, respectively, an identification (ID) label 1022, 1024, or 1026 attached to the elongate tube 1002 near the proximal closure 1004. The ID label may be attached to the elongate tube 1002 with a self-adhesive sticker or embedded within the wall of the elongate tube 1002. The ID label includes machine readable information and may additionally include human readable information that is written on an outer surface of the ID label. Either or both of the machine readable information and the human readable information may include various patient data, such as a name, a birthdate, a unique reference code (e.g., an alphanumeric sequence), and other patient data. The ID label of the specimen container 1000 can be detected and read by a scanning component of the specimen processing system 100, as will be discussed in more detail below. As shown respectively in FIGS. 6-8, the ID label may be embodied as a radio-frequency identification (RFID) tag 1022 (e.g., including an internal antenna), a barcode 1024 tag (e.g., including a one-dimensional code format), or a quick response (QR) code 1026 tag (e.g., including a two-dimensional code format).

Figure 2:
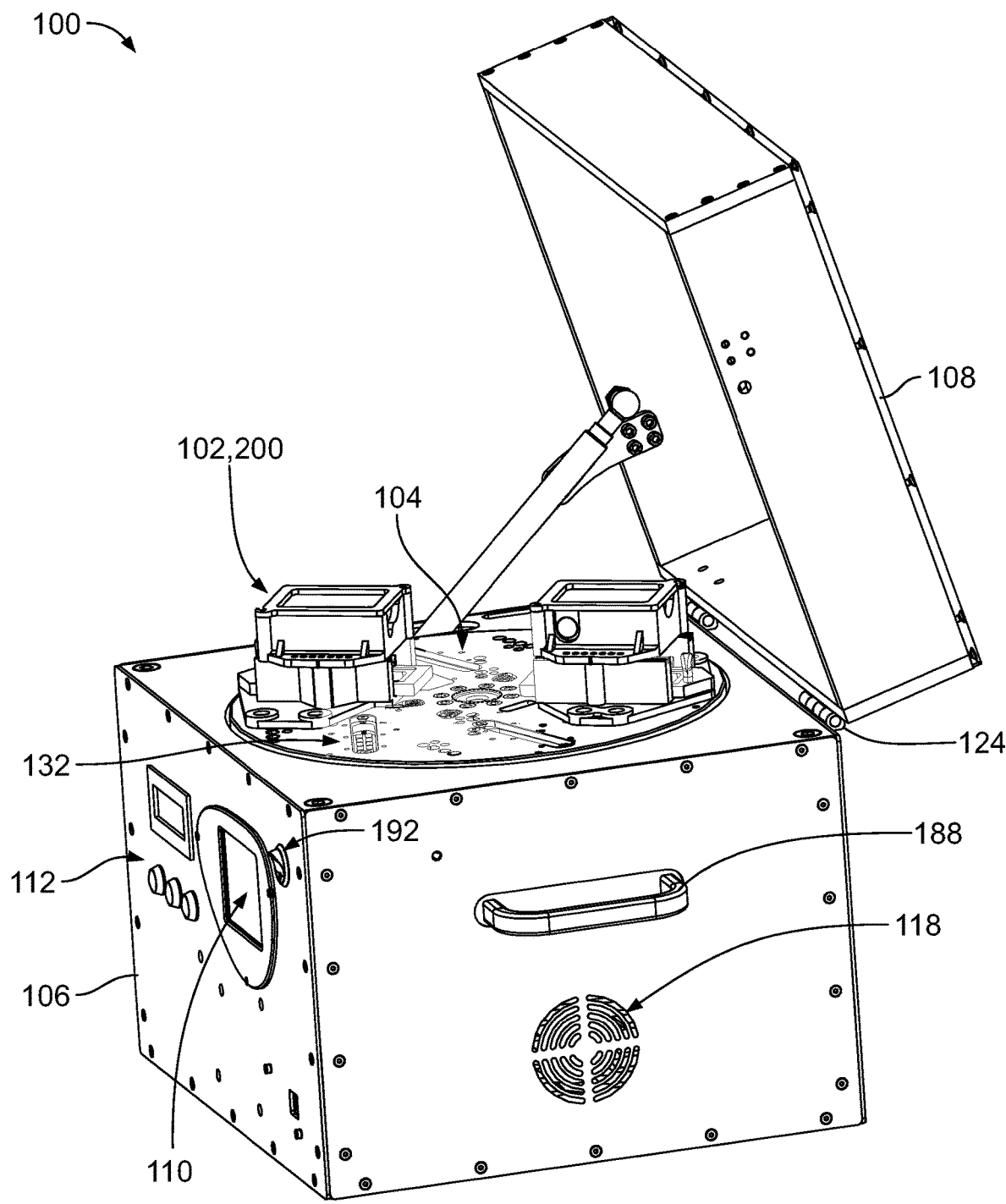
FIG. 2 is a side perspective view of the specimen processing system of FIG. 1.
Figure 3:
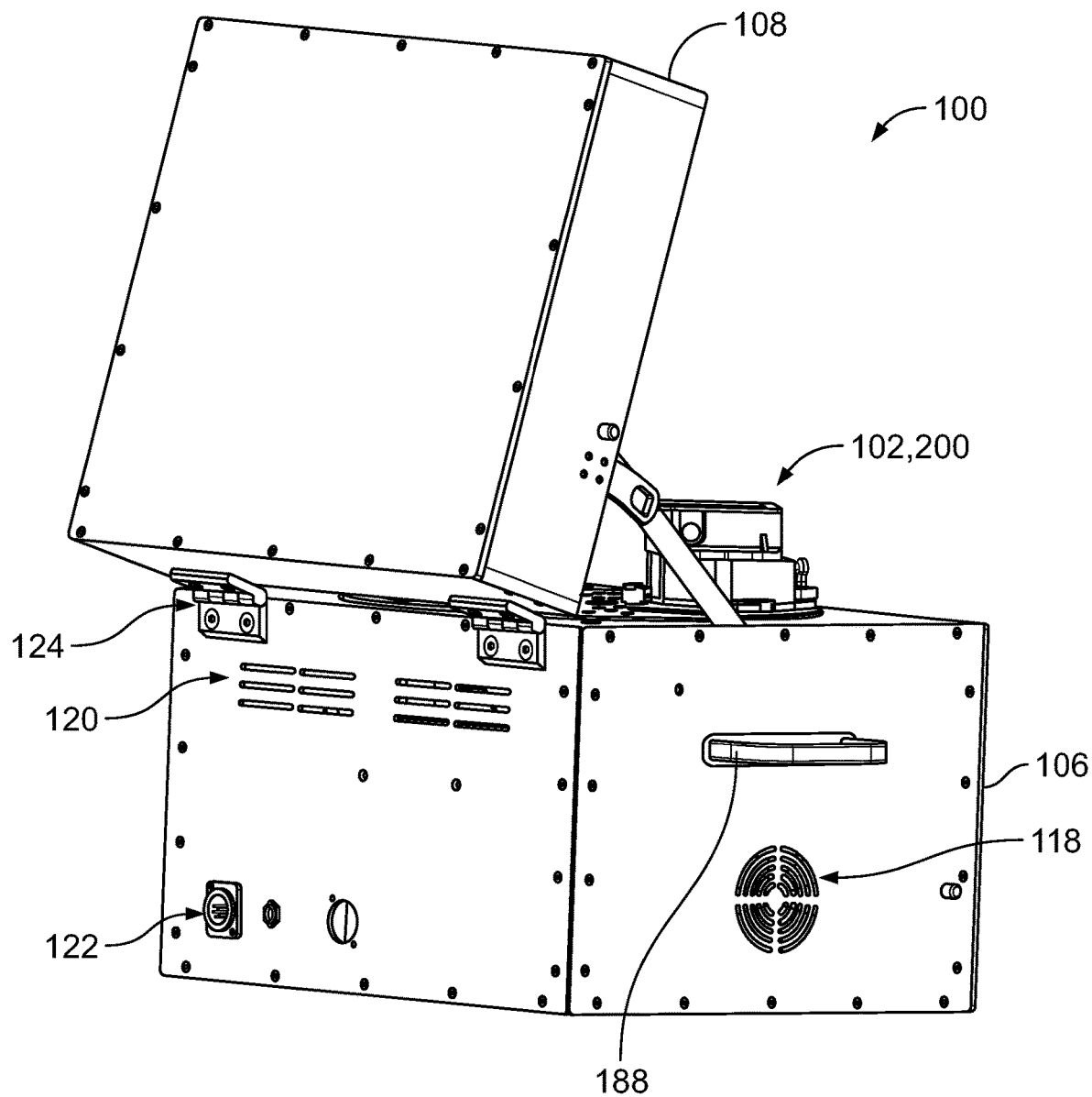
FIG. 3 is a rear perspective view of the specimen processing system of FIG. 1.
Figure 4:
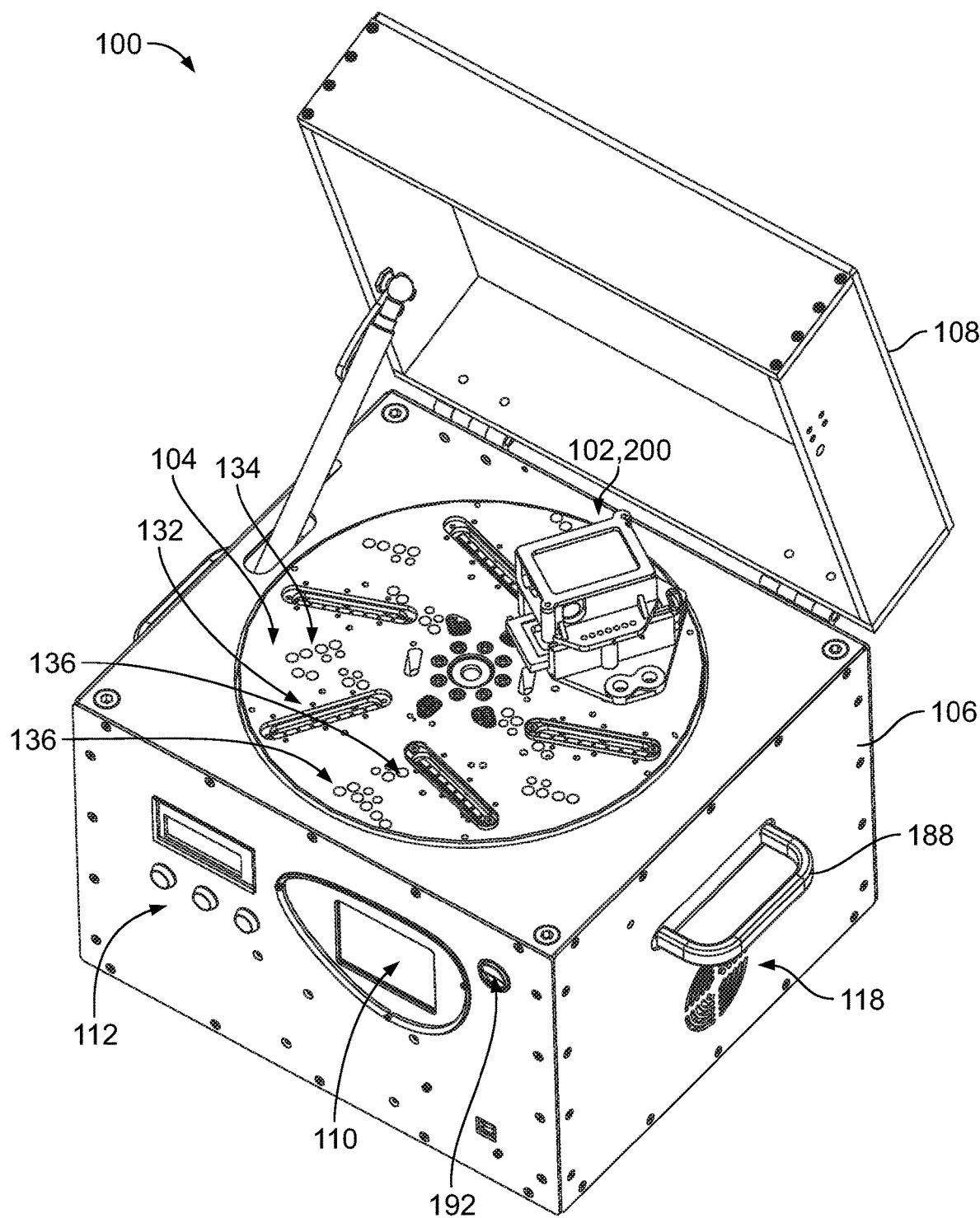
FIG. 4 is a top perspective view of the specimen processing system of FIG. 1 with certain components of a processing station omitted.
Figure 5:
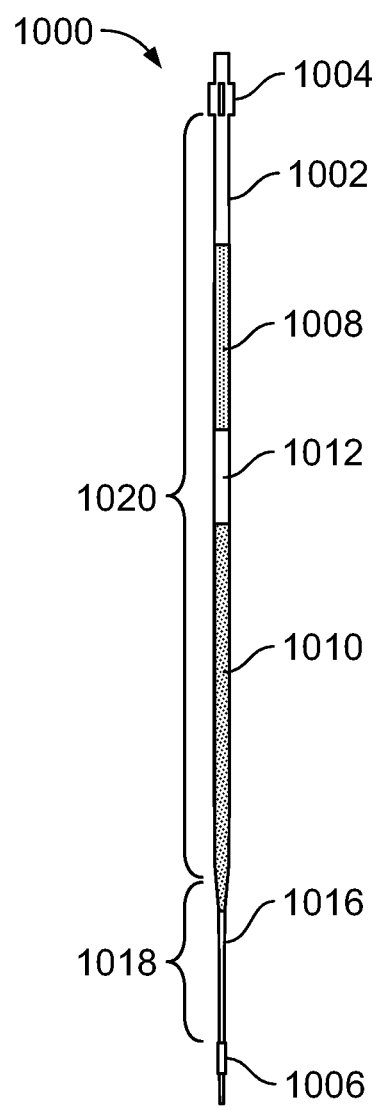
FIG. 5 is a side view of a specimen container that can be processed at the specimen processing system of FIG. 1.

Referring to FIGS. 1, 2, and 4, the specimen processing system 100 is provided as a console that includes multiple processing stations 102 at which respective specimen containers 1000 can be secured to carry out the specimen processing protocol, a platform 104 along which the processing stations 102 are disposed, a housing 106 that encloses internal components located beneath the platform 104, handles 188 for lifting or otherwise moving the specimen processing system 100, and a lid 108. The lid 108 is openable from the housing 106 to permit access to the processing stations 102 and closeable upon the housing 106 to prevent access to or otherwise protect the processing stations 102. The specimen processing system 100 further includes a display screen 110 for presenting various user interfaces, multiple selectors 112 (e.g., buttons) for setting various operational parameters of the specimen processing system 100 and process parameters of the specimen protocol, a power switch 192, and a cable port 114 that are positioned along a front wall of the housing 106, and a power connector 116 that is positioned along a rear wall of the housing 106.

The housing 106 is designed to rest atop a table surface, a floor surface, or another flat surface. The housing 106 defines air vents 118 positioned along lateral walls and air vents 120 positioned along the rear wall. The air vents 118 allow air to circulate into and out of the housing 106 to prevent internal components disposed within the housing 106 from exceeding a threshold temperature of about 80° C. The housing 106 also defines a power connector 122 along the rear wall. The housing 106 is connected to the lid 108 via hinges 124.

In some embodiments, the housing 106 and the lid 108 of the specimen processing system 100 together have a total length of about 0.2 m to about 1.0 m, a total width of about 0.2 m to about 1.0 m, and a total height of about 0.2 m to about 1.0 m. In some embodiments, the specimen processing system 100 has a weight in a range of about 5 kg to about 50 kg and is typically stored on a laboratory floor, a storage facility floor, a table, or a countertop, that has an ambient environmental temperature of about 18° C. to about 28° C. In some embodiments, a receptacle 162 of a processing station 102 has a length of about 5 cm to about 15 cm and a width of about 1 cm to about 5 cm. The housing 106 and the lid 108 are typically made of materials that provide a significant degree of thermal insulation, such as polymers.

Additionally, the specimen processing system 100 includes a timer 126 for tracking durations of various phases of the specimen processing protocol, a reader component 128 that is programmed to read ID labels of specimen containers 1000, and a microcontroller 130 that is programmed to control various features and functionalities of the specimen processing system 100. The timer 126, the reader component 129, and the microcontroller 130 (all illustrated schematically in FIG. 1) may be located at positions that are suitable for their respective functions. For example, any of the timer 126, the reader component 129, and the microcontroller 130 may be mounted on any sidewall of the housing 106 (e.g., a base portion, a lateral portion, a top portion, or a bottom portion) or a support member attached thereto]. For example, in some embodiments, the microcontroller 130 may be located adjacent the display screen 110.

The display screen 110 allows a user to input several parameters that govern operation of the specimen processing system 100 to process (e.g., vitrify) one or more specimens 1001. In some examples, such input parameters are related to a specimen 1001, such as a developmental stage of the specimen 1001 (e.g., resulting in a selection of an oocyte protocol or a blastocyst protocol). The display screen 110 may be an integrated touchscreen or a touchless screen associated with tactile control elements, such as buttons, knobs, dials, or the like.

The microcontroller 130 includes one or more processors that are in communication with and/or are programmed to control various actuators and sensors of the specimen processing system 100 related to various automated features, such as receiving and instantiating user selections input at the display screen 110, reading an ID label of a specimen container 1001, executing the timer 126, spinning the platform 104 at a specified spin speed for a specified duration, detecting an open or closed state of the lid 108, and providing audible and/or visual feedback regarding a progression of the specimen processing protocol. In some embodiments, the platform 104 can only be activated to spin once the lid 108 is closed and interlocked with the housing 106. Furthermore, once the platform 104 is spinning as part of a specimen processing protocol, the lid 108 may not be openable until spinning of the platform 104 has ceased.

Referring particularly to FIG. 4, the platform 104 defines multiple (e.g., six) slots 132 at which a processing station 102 can be secured (e.g., bolted) to the platform 104 in a fixed position. The slots 132 are formed as elongate openings along which a specimen container 1000 can be aligned and therefore define multiple, optional locations at which a specimen container 1000 can be positioned on the platform 104. Each slot 132 is flanked by a set of four holes 134 and two sets of two holes 136 that are distributed in arrangements that are parallel to the slot 132. A processing station 102 can therefore be attached to the platform 104 at the holes 134, 136 for examination of a specimen 1001 inside of a specimen container 1000 positioned along the slot 132. According to an arrangement of the multiple slots 132, sizes of the various components of a processing station 102, and functional requirements of the specimen processing system 100 (e.g., maintaining a substantially balanced mass across the platform 104 during a protocol), only two or three processing stations 102 may be installed to the platform 104 at any given time in some examples, and the two or three processing stations 102 should be spaced circumferentially, substantially equally apart from one another about the platform 104. In other examples, a different number and spacing of processing stations 102 may be implemented, as long as a method of balancing mass across the platform 104 is employed, such as by strategically placing counterweights along the platform 104.

Figure 9:
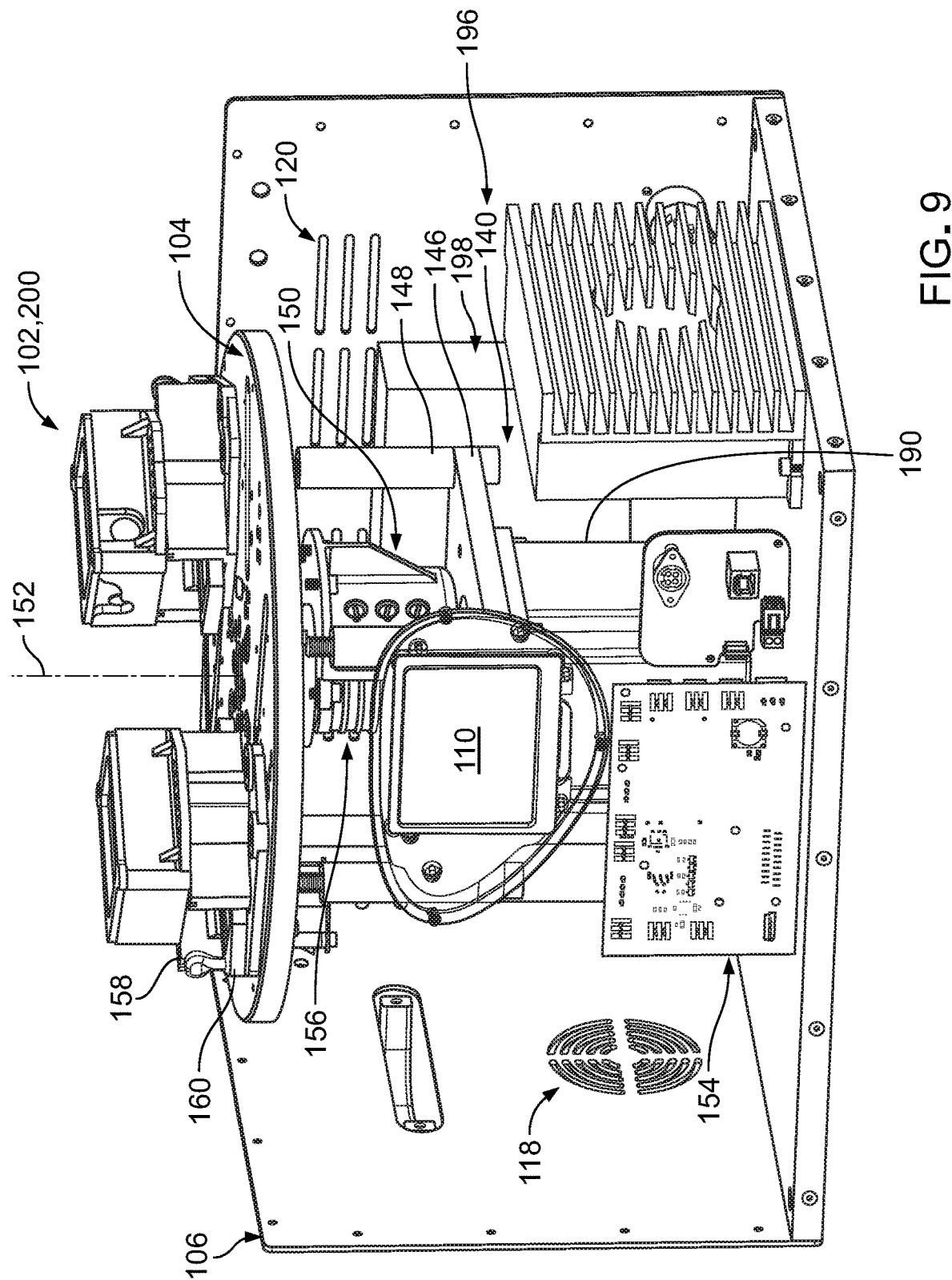
FIG. 9 is a front perspective view of the specimen processing system of FIG. 1 with certain portions of a housing omitted to expose certain internal components.
Figure 10:
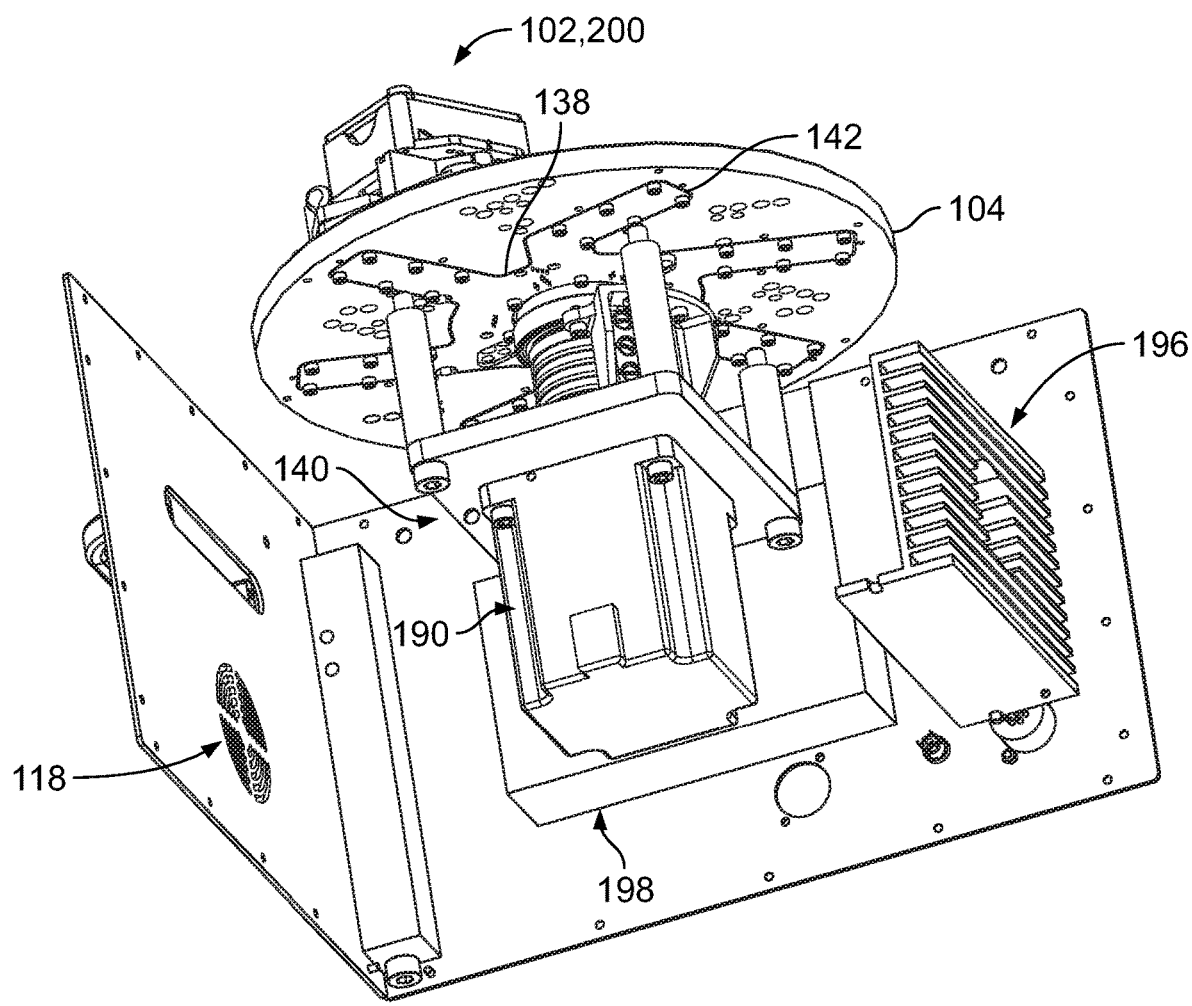
FIG. 10 is a bottom perspective view of the specimen processing system of FIG. 1 with certain portions of a housing omitted to expose certain internal components.

Referring to FIGS. 9 and 10, in which certain portions of the housing 106 and the lid 108 have been omitted to expose certain interior features, the specimen processing system 100 further includes a printed circuit board (PCB) 138 and a motor assembly 140 that are assembled with the platform 104 and a PCB 154 that is positioned along a front wall (omitted from FIGS. 9 and 10 for clarity) of the housing 106. In some embodiments, the timer 126 and the microcontroller 130 (illustrated schematically in FIG. 1) are implemented at the PCB 154. An assembly of the platform 104 and the motor assembly 140 ensures fast and smooth acceleration between rotational speed changes of the platform 104.

Referring particularly to FIG. 10, the PCB 138 is attached (e.g., bolted) to a bottom surface of the platform 104 and includes multiple (e.g., six) extension plates 142 that are sized, positioned, and oriented to align with the multiple slots 132 of the platform 104. A matrix (e.g., two arrays) of multiple light emitting diodes (LEDs) 144 are mounted to an upper surface of each extension plate 142 and are exposed through the slots 132 of the platform 104 (refer to FIG. 4). The motor assembly 140 includes a rotatable motor block 190, a support plate 146 attached to an upper surface of the motor block 190, support columns 148 that extend from the support plate 146 to the platform 144, and a cylindrical coupling unit 150 that extends from the motor block 190 (e.g., through the support plate 146) to the platform 104. The motor block 190 may be a servo motor or a stepper motor with an attached encoder to provide continuous monitoring of motor speed and position such that specific commands can be executed to move the platform 104 to specific positions as desired for carrying out various actions (e.g., mounting or dismounting a specimen container 1000 from the specimen processing system 100). The cylindrical coupling unit 150 is attached to both the platform 104 and the motor block 190, such that rotation of the motor block 190 causes rotation of the coupling unit 150 and rotation of the platform 104 about a central axis 152 of the platform 104. Additionally, the specimen processing system 100 also includes a motor power supply and heat sink 196 and a power converter 198 that converts source electricity (e.g., 110 Volts/220 Volts) for some, or all, of the components requiring electricity in the specimen processing system 100. The cylindrical coupling unit 150 is equipped with multiple cylindrical electrical contacts 156 (e.g., slip rings) that transmit data and control signals among the processing stations 102, the motor block 190, and the microcontroller 130.

Figure 11:
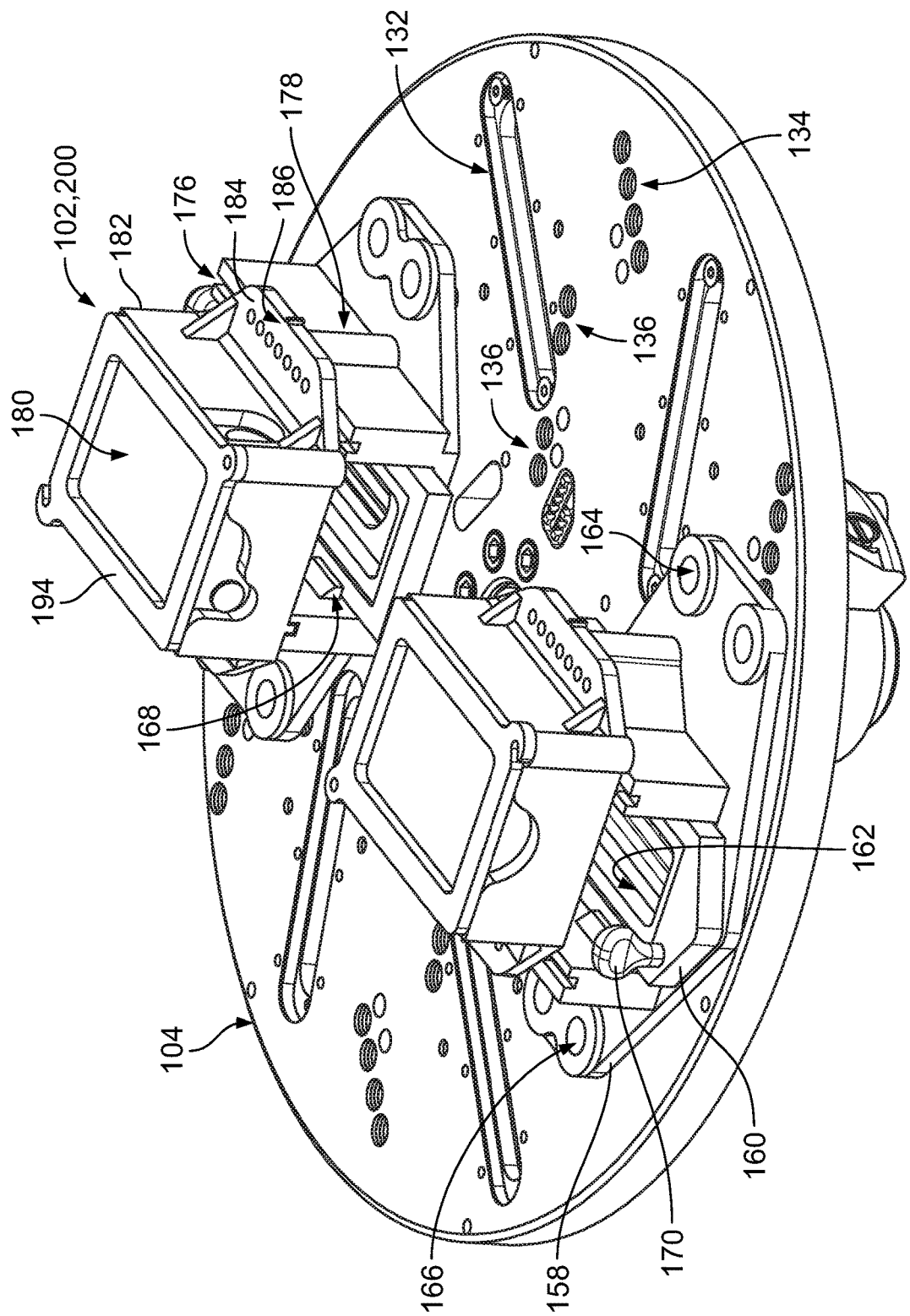
FIG. 11 is a front perspective view of a platform and certain other associated components of the specimen processing system of FIG. 1.
Figure 12:
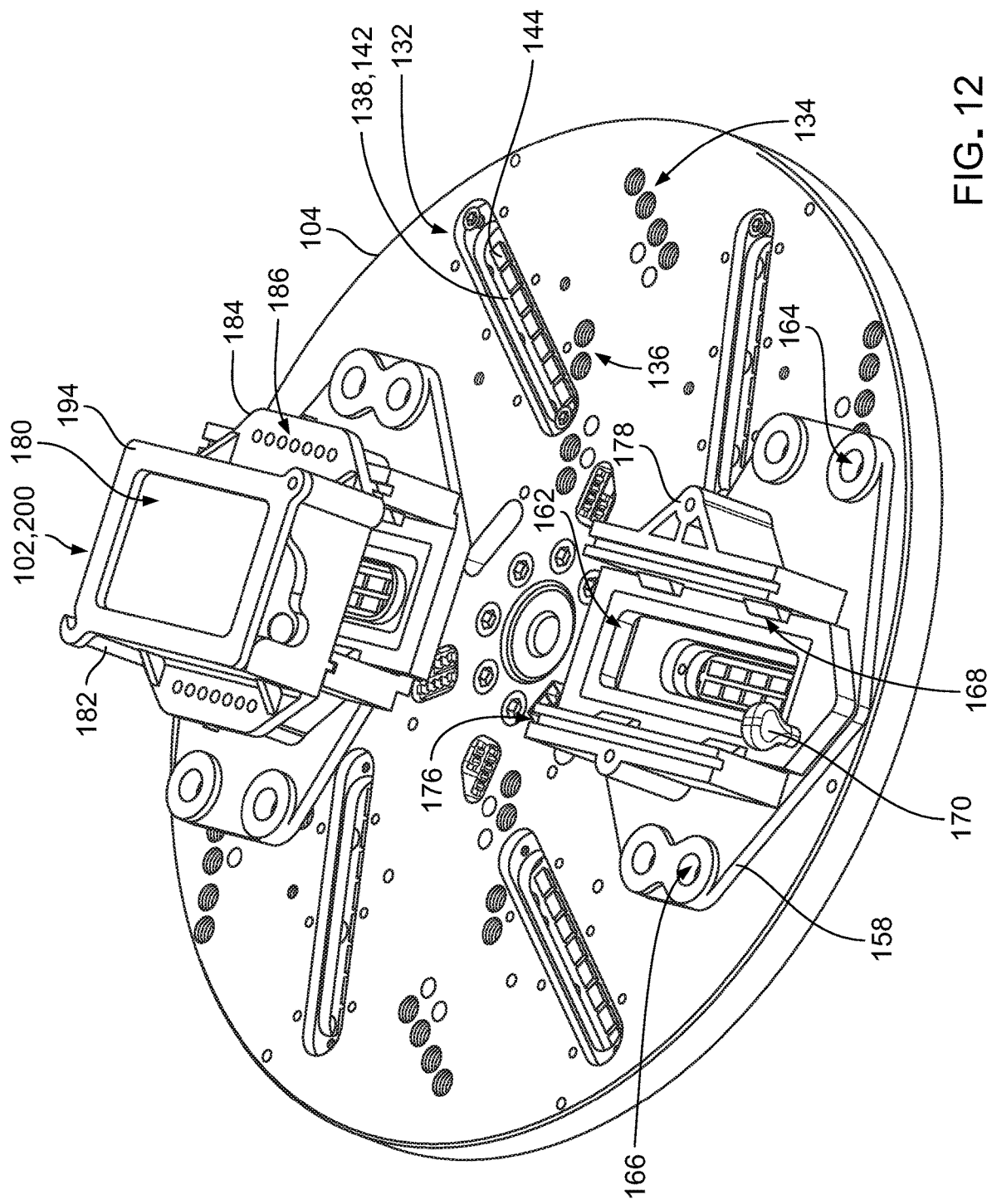
FIG. 12 is a top perspective view of the platform of FIG. 11.

Referring to FIGS. 11 and 12, each processing station 102 includes a lower bracket 158 and an upper bracket 160 that together define a receptacle 162 for holding a specimen container 1000 along a slot 132 of the platform 104. In some embodiments, the processing station 102 further includes one or more spring-loaded retaining strips or clamps that help to secure the specimen container 1000 within the receptacle 162. The lower bracket 158 defines holes 164 and holes 166 that are positioned to be aligned with one or more of the holes 134 and one or more of the holes 136 for attaching the processing station 102 to the platform 104 along a particular slot 132. The lower bracket 158 also defines multiple (e.g., four) flanges 168 that secure the upper bracket 160 to the lower bracket 158. Each processing station 102 also includes a post 170 that passes through alignment holes defined respectively by the upper and lower brackets 160, 158 to ensure a correct positioning of the upper bracket 160 along the lower bracket 158. The lower bracket 158 further defines oppositely disposed, raised slots 176 and lateral through channels 178. The upper and lower brackets 160, 158 of the processing station 102 and the platform 104 are typically made of one or more metals, such as aluminum, magnesium, stainless steel, and other metals.

Each processing station 102 further includes a camera 180 by which movement of a specimen 1001 within a specimen container 1000 can be observed, a mounting bracket 182 that supports the camera 180, and a cover plate 194 for containing the camera 180 within the mounting bracket 182. The mounting bracket 182 defines two oppositely disposed elongate projections 184 that are sized and positioned to slide within the raised slots 176 to position the camera 180 at a desired location along the lower bracket 158. The mounting bracket 182 further defines two sets of oppositely disposed holes 186 along the projections 184 that can be selectively aligned with the through channels 178 to secure the mounting bracket 182 to the lower bracket 158 at the desired location.

When the specimen 1001 is to be processed within the specimen container 1000 at the specimen processing system 100, an operator inputs detailed information about the specimen 1001 at the display screen 110, or such information may be automatically imported into the specimen processing system 100 from another device through a data connection. In some embodiments for which the specimen container 1000 is not pre-equipped with an ID label (e.g., an ID label 1022, 1024, or 1026), the specimen processing system 100 may be configured to print human readable information or a barcode onto an ID label using the automatically imported information and further attach the ID label to the specimen container 1000, or the printed ID label may then be manually attached to the specimen container 1000 by the operator.

In any case, once the detailed information about the specimen 1001 is inputted manually or imported automatically, the operator then loads the specimen container 1000, equipped with the ID label, into a receptacle 162 at a processing station 102. The reader component 128 can detect a presence of the specimen container 1000 within the receptacle 162 by reading the ID label and can communicate such detection to the microcontroller 130. In some embodiments, the reader component 128 may be a feature of the camera 180. For example, if the ID label is provided as a barcode label 1024 or as a QR code label 1026, then the camera 180 may be configured and programmed to read such label.

If the manually inputted or automatically imported information does not match the information that the reader component 128 reads from the ID label, then the specimen processing system 100 generates and displays an error on the display screen 110 and prevents activation of a specimen processing protocol. If the manually inputted or automatically imported information does match the information that the reader component 128 reads from the ID label, then the specimen processing system 100 can cause the timer 126 to be activated for processing the specimen 1001 according to a specified protocol. According to one or more signals received from the microcontroller 130, the platform 104 can spin about the central axis 152 to exert enough centripetal force on the specimen 1001 to cause the specimen 1001 to move along the axial direction 1003 within the specimen container 1000 toward the distal closure 1006 (refer to FIG. 5) according to the protocol. While the platform 104 is spinning, the specimen 1001 and the various processing media (e.g., the equilibration and vitrification solutions 1008, 1010, and any other media) within the specimen container 1000 can be visualized (e.g., imaged) by the camera 180. In some embodiments, one or more parameters of the protocol may be determined by or associated with the type of ID label (e.g., RFID, bar code, or QR code) present on the specimen container 1000.

The microcontroller 130 can adjust either or both of a rotational speed of the platform 104 and a duration of one or more phases of the protocol based on feedback from a vision system (e.g., including the camera 180) regarding an axial position of the specimen 1001, as will be discussed in more detail. Such protocol adjustments can optimize time periods of specimen exposure to the processing media within the specimen container 1000. Upon completion of the processing protocol, the specimen container 1000 may be removed from the receptacle 162 and placed within a low temperature substance for vitrification and cryopreservation of the specimen 1001 contained within the specimen container 1000.

Figure 13:
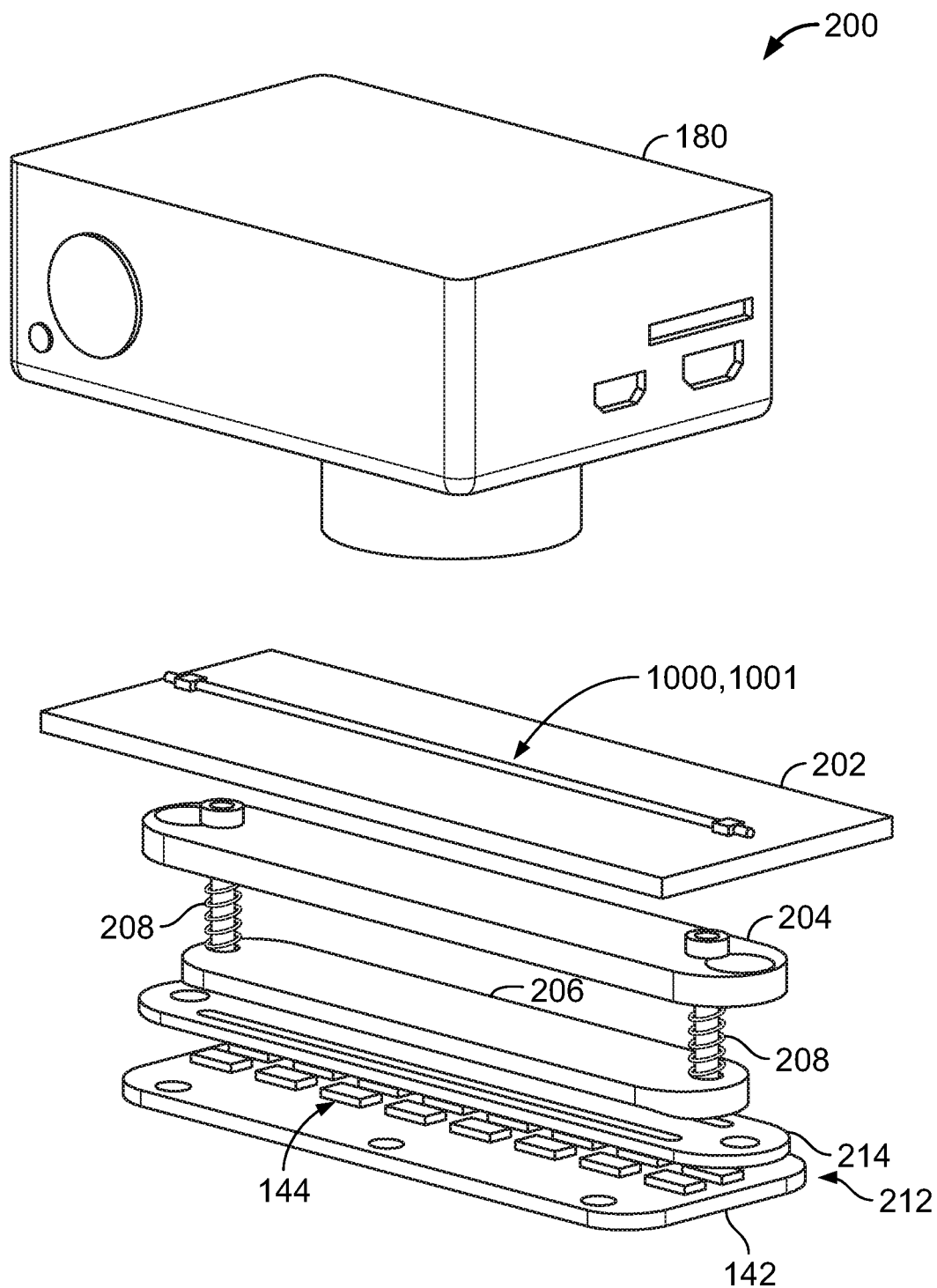
FIG. 13 is an exploded perspective view of a vision system of the specimen processing system of FIG. 1.

As discussed above, a camera 180 can be used to track a position of a specimen 1001 within the specimen container 1000 during a specimen processing protocol. As shown in FIG. 13, each camera 180 is a component of a vision system 200 located at each processing station 102 of the specimen processing system 100. In addition to a camera 180, each vision system 200 further includes an optically clear plate 202 on which the specimen container 1000 can be supported, upper and lower lenses 204, 206 (e.g., plano-convex lenses), two adjustment screws 208 that extend between the upper and lower lenses 204, 206, two compression springs 210 that respectively surround the adjustment screws 208, a light source 212 that includes an extension plate 142 of the PCB 138 and a matrix (e.g., one or more arrays) of LEDs 144 distributed along the extension plate 142, and an opaque light stop 214 that blocks centrally directed light rays (e.g., light rays directed substantially towards a central axis 1028 of the specimen container 1000) from impinging on the specimen container 1000. In some embodiments, a plate 202 of a vision system 200 may be disposed within the a slot 132 of the platform 104. The camera 180 is typically located at a distance of about 1 cm to about 5 cm above the platform 104.

The upper and lower lenses 204, 206 are focusing lenses that can collimate light radiating from the LEDs 144 into a light beam and focus the light beam onto an expected path of the specimen 1001 (e.g., generally along the central axis 1028 of the specimen container 1000). Accordingly, the adjustment screws 108 and the surrounding compression springs 210 allow a height adjustment of the upper and lower lenses 204, 206 such that the focal point of the light beam coincides with a height of the support plate 202 on which the specimen container 1000 is held. The support plate 202 is typically positioned at a distance of about 0.1 cm to about 1.5 cm above the light source 212.

The light stop 214 blocks centrally directed light rays from the LEDs 144 such that when the upper and lower lenses 204, 206 are focused correctly, peripheral edges (e.g., located off-axis) of the specimen 1001 are illuminated. Therefore, the peripheral edges of the specimen 1001 appear brighter than an interior region of the specimen 1001 to make the specimen 1001 more visible to the camera 180 in a manner similar to that of dark field illumination. Furthermore, the vision system 200 may include a filtering functionality that blocks light with wavelengths of less than about 500 nm from reaching the specimen 1001, as exposure to such wavelengths over the extended period of specimen tracking may be detrimental to the health and subsequent biological development of the specimen 1001. Accordingly, the configuration and functionality of the various components of the vision system 200 for achieving dark field illumination advantageously allow for fine control and constraint of intensity, exposure time, and wavelength of light radiating from the light source 212 to the specimen 1001, which can be important to the survival of the delicate biological specimen 1001.

The camera 180 can track a linear movement of the specimen 1001 throughout a specimen processing protocol in real time by continuously generating images of the specimen 1001 and feeding the images at regular intervals or in the form of a real-time video feed wirelessly to a remote computing device running a software algorithm 300 (refer to FIG. 19) that processes the images to track a position of the specimen 1001 or through a wired connection via the electrical contacts 156 to one or more processors of the microcontroller 130 running the software algorithm 300. Referring to FIG. 14, the specimen container 1000 is allowed to sit in place (e.g., stationary) in the receptacle 162 for a first predetermined exposure period during the specimen processing protocol so that the specimen 1001 can equilibrate in the equilibration solution 1020. The first exposure period may range from about 5 minutes to about 15 minutes, depending on various parameters of typical ART protocols.

During the first exposure period, the equilibration solution 1020 draws water molecules out from the specimen 1001 and infuses cryoprotectants into the specimen 1001 according to osmotic potential. The reduction of water content and addition of cryoprotectants aids in minimizing damage to cellular components of the specimen 1001 during freeze and warming cycles. Although the specimen 1001 is denser than the equilibration solution 1020 and will therefore very gradually descend through the equilibration solution 1020 due to gravitational forces over time, the specimen 1001 will typically still be suspended within the equilibration solution 1020 and will not have yet reached the separation fluid 1024 by the end of the first exposure period, as shown in FIG. 14.

Referring to FIGS. 15-18, once the specimen 1001 has been exposed to the equilibration solution 1020 for the predetermined exposure period, the platform 104 is activated to spin the specimen container 1000 at a select low speed to advance the equilibration solution 1020 and the specimen 1001 axially through the separation fluid 1024 to the vitrification solution 1022. The specimen container 1000 is typically spun for about 0.5 minutes to about 5 minutes at an angular speed of about 50 rpm to about 1200 rpm, which exerts enough centripetal force on the specimen 1001 to cause the specimen 1001 to descend into the vitrification solution 1022 in a timely manner, but not enough to cause mechanical damage to the specimen 1001. Such speed (e.g., corresponding to about 5 g to about 200 g) is significantly slower than speeds of even very low-speed conventional laboratory centrifuges, which are typically capable of revolving specimens about a centrifuge axis at speeds in a range of about 4000 rpm to about 300,000 rpm (e.g., corresponding to about 2,500 g to about 65,000 g).

Referring particularly to FIG. 15, during an initial phase of spinning, the specimen 1001 descends within the equilibration solution 1020 while the equilibration solution 1020, containing the specimen 1001, descends via bulk motion through the separation fluid 1024 (e.g., thereby displacing the separation fluid 1024) toward the vitrification solution 1022. Referring particularly to FIG. 16, during a subsequent phase of spinning, the equilibration solution 1020 reaches the vitrification solution 1022, and the specimen 1001 passes from the equilibration solution 1020 into the vitrification solution 1022. Referring particularly to FIG. 17, during a next phase of spinning, the equilibration solution 1020 merges with the vitrification solution 1022 to form a combined vitrification solution 1030 (e.g., including the equilibration solution 1020, the vitrification solution 1022, and a mixed solution interface layer between the equilibration solution 1020 and the vitrification solution 1022), and the specimen 1001 continues to descend through the combined vitrification solution 1030.

Referring particularly to FIG. 18, during a final phase of spinning, the specimen 1001 rests on a meniscus 1032 of the distal air pocket 1028 due to surface tension and thereby avoids contact with the relatively hard wall of the elongate tube 1002. For example, due to a balance between surface tension at the interface of the combined vitrification solution 1030 and the distal air pocket 1028, and tension between combined vitrification solution 1030 and an interior wall of the tapered portion 1016, the potential buoyancy force of the distal air pocket 1016 is not sufficient to break through meniscus 132. Therefore, the specimen 1001 cannot penetrate the meniscus 1032.

With the specimen 1001 resting on the meniscus 1032 of the distal air pocket 1028 upon completion of spinning, the timer 126 is activated, and the specimen container 1000 is allowed to sit in place (e.g., stationary) in the receptacle 162 for a second predetermined exposure period for the specimen 1001 to be exposed to the combined vitrification solution 1030. The second exposure period may range from about 0.5 minutes to about 2 minutes, depending on various parameters of typical ART protocols. During the second exposure period, permeation of cryoprotectants within the combined vitrification solution 1030 into the specimen 1001 replaces water within the specimen 1001, thereby dehydrating the specimen and further infusing the specimen 1001 with cryoprotectants. Such a stage-like progression of media concentrations avoids an excessively high initial osmotic differential that could otherwise cause cells of the specimen 1001 to shrink too much and too rapidly as the water leaves the cells at a rate faster than the cryoprotectants can enter the cells.

Owing to a preloaded state of the equilibration solution 1020 and the vitrification solution 1022 within the specimen container 1000, a specimen 1001 can be prepared for vitrification within a single, isolated environment (e.g., the lumen of the specimen container 1000) without being exposed to contamination, mechanical damage (e.g., from a micropipette or other specimen holding or fluid delivery device), or other accidental mishandling that may otherwise occur when a container that houses a specimen is accessed multiple times to deliver and remove various processing mediums or when a specimen is moved to various containers (e.g., petri dishes, test tubes, or flask) during an ART process.

In some implementations, once the second exposure period has ended, the specimen container 1000, containing the specimen 1001, is then manually transferred from the receptacle 162 to a long-term low temperature storage structure, where the specimen 1001 can be maintained in a cryogenic state for a period of up to about 20 years. In some instances, the specimen container 1000 may be stored in the long-term low temperature storage structure for a much shorter period (e.g., as short as few hours).

Figure 19:
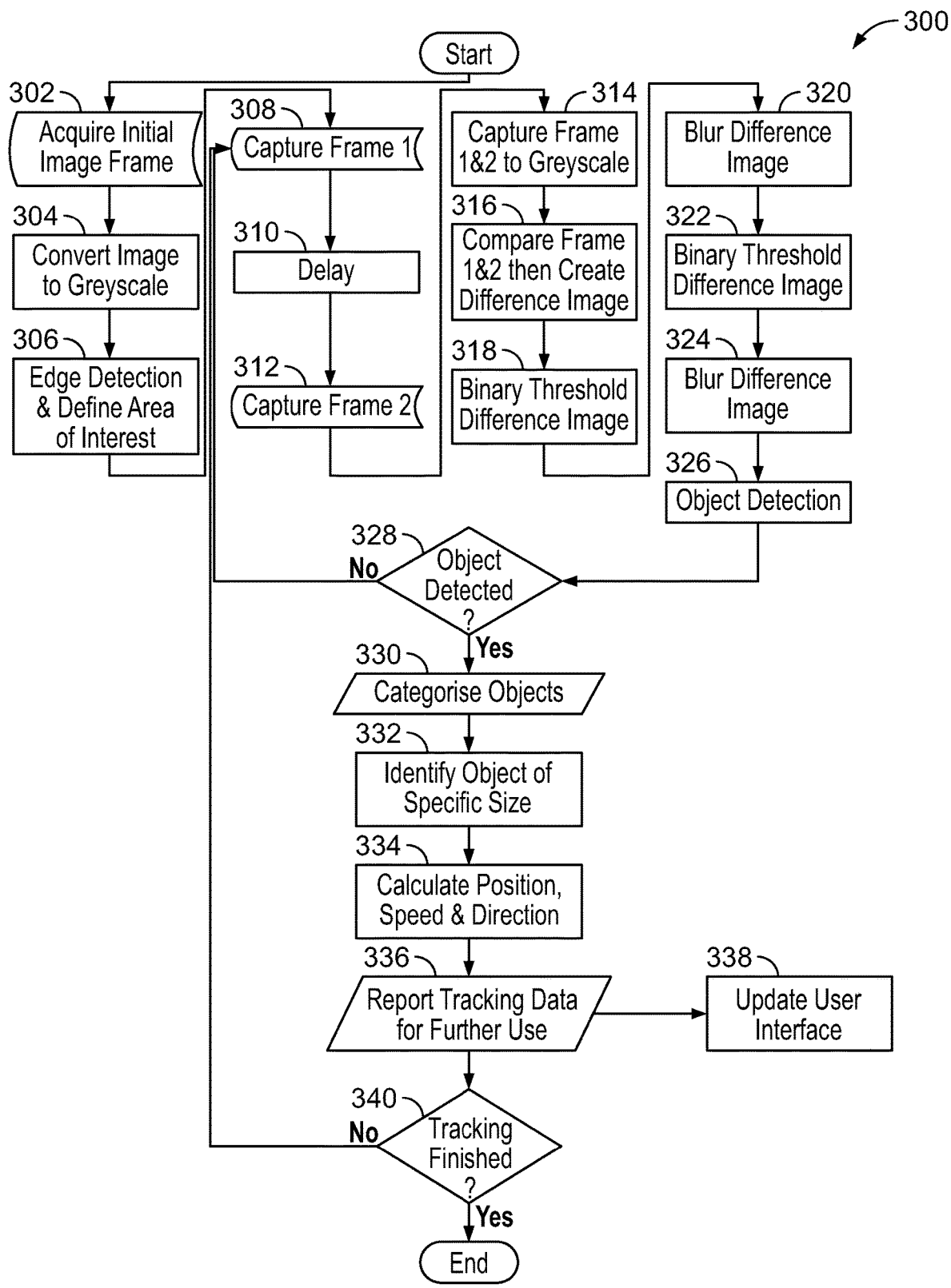
FIG. 19 illustrates a flowchart of a software algorithm that processes images of a specimen during a protocol carried out at the specimen processing system of FIG. 1.

The software algorithm 300 used to track the position of the specimen 1001 may be executed on the microcontroller 130 or on a separate, external computing device (e.g., a desktop computer, a laptop, a tablet, or a single board computer) running an operating system that is electrically coupled to the specimen processing system 100 via a data connection (e.g., a USB connection, an RS232 connection, or a wireless data connection). Referring to FIG. 19, the software algorithm 300 enters a process flow loop in which the software acquires a single color image from the camera feed (302), converts the image to greyscale, and stores the greyscale image in an array that holds a grey value for each pixel of the greyscale image (304). The algorithm 300 then performs an edge detection routine on the greyscale image to detect edges (e.g., an outline) of the specimen container 1000 and therefore define a size and a position of an area of interest with respect to a field of view of the camera 180 in which the position of the specimen 1001 will be tracked (306).

The algorithm 300 then captures a first subsequent color image from the camera feed (308), waits for a period of time (310), and then captures a second subsequent color image from the camera feed (312). As the first and second subsequent color images are captured, the images are cropped to the area of interest. The algorithm 300 also converts the first and second subsequent color images to greyscale, and stores the first and second greyscale images in an array that holds a grey value for each pixel of the greyscale images (314). The algorithm 300 then compares the first and second greyscale images to each other and generates an additional array that stores the pixilation differences between the first and second grayscale images as a difference image (316). The algorithm 300 converts luminosity data from the difference image to a binary value based on an upper constraint and a lower constraint to generate a first binary threshold difference image (318). For example, all image data that falls between the upper and lower constraints is maintained in the first binary threshold difference image, whereas all image data that falls outside of the range defined between the upper and lower constraints is discarded.

The algorithm 300 then blurs the first binary threshold difference image to remove noise and thereby generates a first blur difference image (320). The algorithm 300 again converts luminosity data from the first blur difference image to a binary value based on an upper constraint and a lower constraint to generate a second binary threshold difference image with even less noise as compared to the first binary threshold difference image (322). In this case, the binary value, upper constraint, and lower constraint are independent of those used to generate the first binary threshold difference image. The algorithm 300 also blurs the second binary threshold difference image to further remove noise and thereby generate a second blur difference image (324).

The algorithm then passes the second binary threshold difference image to an object detection routine (326) in which a specimen 1001 may be identified in the image. If a specimen 1001 is not identified in the image (328), then the algorithm 300 returns to the step of capturing a first subsequent color image from the camera feed (308). If a specimen 1001 is identified in the image (328), then the algorithm 300 categorizes (e.g., determines) a location of the specimen 1001 and stores the location in an array of object positions (330). Using a predetermined maximum and minimum threshold, the algorithm 300 identifies the specimen 1001 based on the number of pixels (e.g., for a known camera resolution), which represents a generally circular area of the specimen 1001 under a known magnification within the array (332). The algorithm 300 stores a center position, a speed (based on a time elapsed between the previously processed image and positions of the specimen 1001 in the current and previously processed image), and a direction of the specimen 1001 in another array (334). For example, the maximum and minimum thresholds provide maximum and minimum limits count of at least partially contiguous pixels forming a generally circular area that represents approximate geometry limits of the specimen 1001. Records of speed and position of the center position are tracked to verify the motion of at least one specimen 1001.

The algorithm 300 outputs the center position, speed, and direction data of the specimen 1001 for further processing (336). For example, in some embodiments, the algorithm 300 outputs the data to the display screen 110 for viewing by an operator (338) and to a component of the microcontroller 130. In some embodiments, the algorithm 300 additionally outputs the data to a component of the external computing device via the data connection. If the algorithm 300 has finished tracking the specimen 1001 (340), then the algorithm 300 exits the process flow loop. If the algorithm 300 has yet to finish tracking the specimen 1001 (340), then the algorithm 300 returns to capture a first subsequent color image from the camera feed (308).

Using the information from the algorithm 300, the microcontroller 130 can control the rotational speed, spin direction, and acceleration of the platform 104 via communication with the motor assembly 140 to ensure that the specimen 1001 is exposed to a substantially constant centripetal force as programmed by the user, irrespective of an axial position of the specimen 1001 within the specimen container 1000 (e.g., a radial position of the specimen 1001 along the platform 104). For example, according to one or more signals transmitted by the microcontroller 130, the platform 104 can spin about the central axis 152 to exert enough centripetal force on the specimen 1001 to cause the specimen 1001 to move along the central axis 1028 of the specimen container 1000 toward the distal closure 1006 according to a specified protocol. The one or more signals can be used to adjust an angular speed of the platform 104 and/or a duration of one or more phases of the protocol. Such protocol adjustments can optimize time periods of specimen exposure to the processing media within the specimen container 1000.

In some embodiments, a specimen container that is otherwise similar to the specimen container 1000 may itself include one or more embedded optical elements (e.g., one or more lenses) that enable a specimen 1001 to be more clearly seen by the naked eye or visualized by the camera 180 of the vision system 200 during or separate from an automated specimen tracking routine carried out at the specimen processing system 100.

Figure 20:
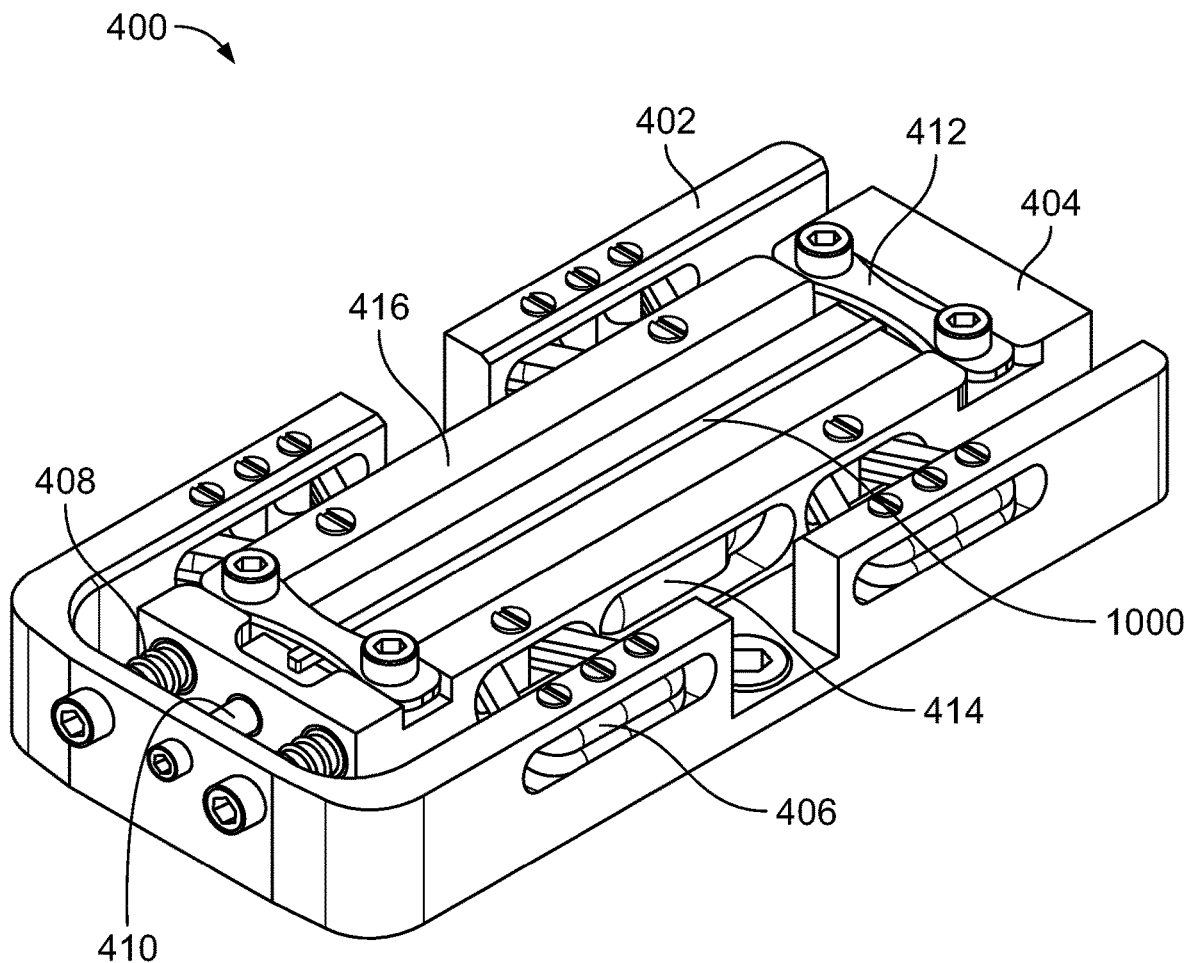
FIG. 20 is a perspective view of vibration assembly of the specimen processing system 100.

In some embodiments, the specimen processing system 100 is further equipped with one or more vibration assemblies designed to excite movement of either or both of a specimen 1001 or fluids within a specimen container 1000 while the specimen container 1000 is processed at the specimen processing system 100. For example, FIG. 20 illustrates such a vibration assembly 400 that is designed to securely support a specimen container 1000. One or more vibration assemblies 400 can be respectively installed to one or more of the processing stations 102 of the specimen processing system 100 in place of a respective upper bracket 160 of a processing station 102.

The vibration assembly 400 includes a base 402 that can be secured to the platform 104 at a processing station 102 and to which the other components of the vibration assembly 400 are mounted. The vibration assembly 400 further includes a mounting platform 404 that is formed to support a specimen container 1000 and that is movable (e.g., suspended in free space) with respect to the base 402. For example, the vibration assembly 400 further includes two frames 406 along which the mounting platform 404 can move laterally and longitudinally, two dynamic spacers 408 (e.g., springs or other members made of compliant materials) that limit excessive outward movement due to centripetal force during spinning, and an adjustable stop 410 that permits some free movement against the dynamic spacers 408 without the need to rigidly attach the mounting platform 404 to the base 402. At least a central portion of the mounting platform 404 is made of an optically transparent material to allow focused light from the vision system 200 to pass through and illuminate the specimen 1001 within the specimen container 1000. The vibration assembly 400 also includes opposed restraining clamps 412 that can clamp the specimen container 1000 to the mounting platform 404.

The vibration assembly 400 further includes a motor 414 that vibrates the mounting platform 404 along an x axis and a motor 416 that vibrates the mounting platform 404 along ay axis. The motors 414, 416 may be activated via electrical signals received from the electrical contacts 156 within the housing 106. The motors 414, 416 may be activated simultaneously or at different times to achieve a desired movement direction. A drive voltage of the motors 414, 416 may also be adjusted to change vibration frequencies of the motors 414, 416.

Figure 21:
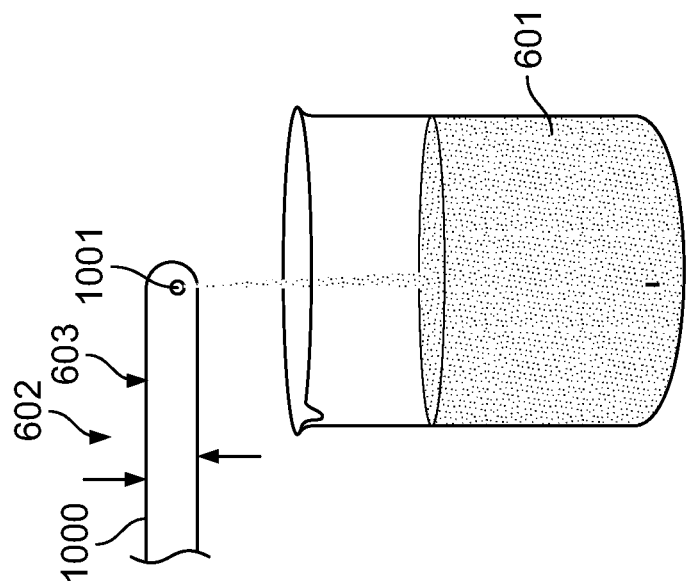
FIG. 21 is a side view of a cut-and-seal station of a specimen processing system.
Figure 22:
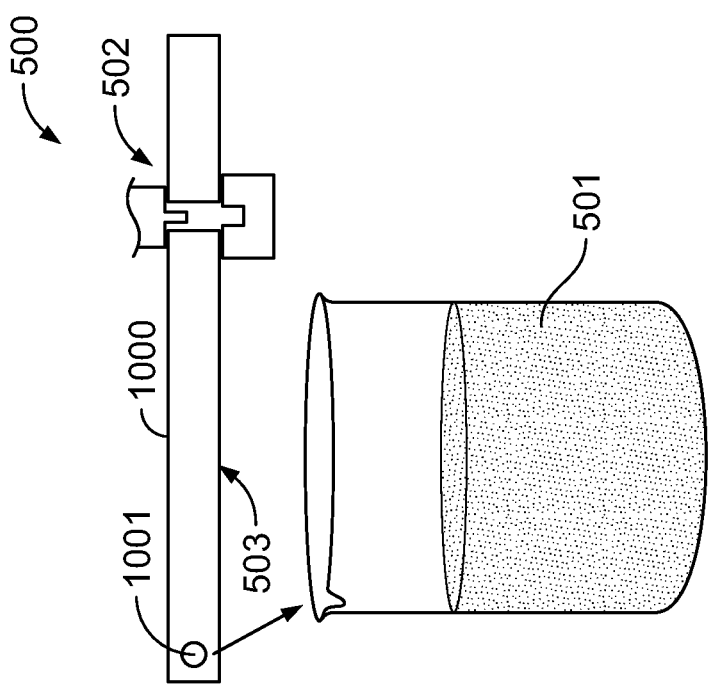
FIG. 22 is a side view of a cutting station of a specimen processing system.

In some embodiments, a specimen processing system that is similar in construction and function to the specimen processing system 100 may be further equipped with features for cutting and subsequently sealing a specimen container 1000. For example, in some examples, there may be a need to cut excess length from the specimen container 1000 after the specimen 1001 has been processed and is disposed at a distal end of the specimen container 1000. FIG. 21 illustrates a cut-and-seal station 502 of a specimen processing system 500 at which a specimen container 1000 can be simultaneously cut and sealed (e.g., via a heat seal, an ultrasonic seal, or a crimp) prior to a distal storage portion 503 of the specimen container 1000 being placed in a low temperature substance 501. In some embodiments, a specimen container 1000 may be cut and sealed in two separate operations. For example, FIG. 22 illustrates a cutting station 602 of a specimen processing system 600 at which a specimen container 1000 can first be cut and then be automatically sealed, capped, or plugged using dedicated equipment that is part of the specimen processing system 600 prior to a distal storage portion 603 of the specimen container 1000 being placed in a low temperature substance 601.

While the above-discussed specimen processing system 100, specimen processing system 500, specimen processing system 600, specimen container 1000, vision system 200, and vibration assembly 400 have been described and illustrated as including components with certain dimensions, sizes, shapes, materials, and configurations, and with respect to the software algorithm 300, in some embodiments, specimen processing systems, specimen containers, vision systems, vibration assemblies, and software algorithms that are otherwise substantially similar in structure and function to the above-discussed embodiments may include one or more components with different dimensions, sizes, shapes, materials, and configurations or one or more different process flow steps.

For example, while the specimen processing system 100, the vision system 200, and the algorithm 300 have been described and illustrated with respect to tracking one specimen 1001 within a specimen container 1000, in some embodiments, a specimen processing system that is substantially similar in construction and function to the specimen processing system 100 may be operated with an algorithm that is designed to track more than one specimen 1001 within the same specimen container 1000 during a specimen processing protocol.

Accordingly, other embodiments are within the scope of the following claims.

What is claimed is:

1. A specimen processing system, comprising:
a plate for supporting a specimen system, the specimen system comprising a specimen container and a specimen contained therein;
a camera disposed above the plate and configured to generate images of the specimen system;
a light source disposed beneath the plate for radiating light towards the plate;
a light stop for blocking a portion of the light from reaching the specimen system to produce darkfield illumination of the specimen at the camera;
a rotatable platform to which a processing station is secured for applying a centripetal force to the specimen to cause the specimen to move within the specimen container; and
one or more processors electronically coupled to the camera, the one or more processors configured to convert the images from color to greyscale and to track a position of the specimen within the specimen container during a vitrification protocol based on the images.

2. The specimen processing system of claim 1, further comprising an adjustable lens for focusing the light onto the specimen system.

3. The specimen processing system of claim 1, further comprising the processing station, wherein the processing station locates the camera.

4. The specimen processing system of claim 3, wherein the processing station defines a receptacle adjacent the plate for positioning the specimen container.

5. The specimen processing system of claim 3, wherein the processing station comprises a mount for selectively positioning the camera at the processing station.

6. The specimen processing system of claim 1, wherein the one or more processors are further configured to remove noise from the images.

7. The specimen processing system of claim 1, wherein the one or more processors are further configured to detect an object corresponding to the specimen in the images.

8. The specimen processing system of claim 1, wherein the one or more processors are further configured to determine parameters including one or more of a position, a speed, and a direction of the specimen as the specimen moves within the specimen container.

9. The specimen processing system of claim 8, wherein the one or more processors are configured to output one or more of the parameters.

10. The specimen processing system of claim 9, wherein the specimen processing system comprises a motor that can adjust movement of the rotatable platform based on one or more of the parameters.

11. The specimen processing system of claim 1, wherein the light stop is arranged to block the portion of the light from reaching a central axis of the specimen container such that edges of the specimen remain visible to produce darkfield illumination at the camera.

12. The specimen processing system of claim 1, wherein the light source comprises a plurality of light-emitting diodes.

13. The specimen processing system of claim 1, wherein the camera is configured to scan an identification label of the specimen container.

14. The specimen processing system of claim 1, wherein the one or more processors are configured to track respective positions of a plurality of specimens within the specimen container based on the images during the vitrification protocol.

15. The specimen processing system of claim 1, further comprising a vibration assembly configured to direct movement of the specimen within the specimen container during the vitrification protocol.

16. The specimen processing system of claim 1, further comprising a cutting station configured to cut and release a distal portion of the specimen container with the specimen contained therein following completion of the vitrification protocol.

17. The specimen processing system of claim 1, wherein the specimen comprises a reproductive specimen.

18. A method of processing a specimen within a specimen container, the method comprising:
generating images of the specimen within the specimen container at a camera disposed above a plate supporting the specimen container;
directing light towards the plate from a light source disposed beneath the plate;
blocking a portion of the light from reaching the specimen with a light stop to produce darkfield illumination of the specimen at the camera;
applying a centripetal force to the specimen to cause the specimen to move within the specimen container by rotating a platform to which a processing station is secured;
converting the images from color to greyscale at one or more processors in electronic communication with the camera during a vitrification protocol; and
tracking a position of the specimen within the specimen container based on the images at the one or more processors.

19. The method of claim 18, further comprising focusing the light onto the specimen at an adjustable lens.

20. The method of claim 18, further comprising locating the camera at the processing station.

21. The method of claim 20, further comprising positioning the specimen container within a receptacle of the processing station that is adjacent the plate.

22. The method of claim 20, further comprising selectively positioning a mount supporting the camera at the processing station.

23. The method of claim 18, further comprising removing noise from the images at the one or more processors.

24. The method of claim 18, further comprising detecting an object corresponding to the specimen in the images at the one or more processors.

25. The method of claim 18, further comprising determining, at the one or more processors, parameters including one or more of a position, a speed, and a direction of the specimen as the specimen moves within the specimen container.

26. The method of claim 25, further comprising outputting one or more of the parameters from the one or more processors.

27. The method of claim 26, further comprising adjusting movement of the platform based on one or more of the parameters via a motor.

28. The method of claim 18, further comprising blocking the portion of the light from reaching a central axis of the specimen container such that edges of the specimen remain visible to produce darkfield illumination at the camera.

29. The method of claim 18, wherein the light source comprises a plurality of light-emitting diodes.

30. The method claim 18, further comprising scanning an identification label of the specimen container at the camera.

31. The method of claim 18, further comprising tracking respective positions of a plurality of specimens within the specimen container based on the images at the one or more processors during the vitrification protocol.

32. The method of claim 18, further comprising directing movement of the specimen within the specimen container at a vibration assembly during the vitrification protocol.

33. The method of claim 18, further comprising cutting and releasing a distal portion of the specimen container, with the specimen contained therein, following completion of the vitrification protocol at a cutting station.

34. The method of claim 18, wherein the specimen comprises a reproductive specimen.

* * * * *

UNITED STATES PATENT AND TRADEMARK OFFICE
CERTIFICATE OF CORRECTION

PATENT NO. : 11,593,934 B2
APPLICATION NO. : 16/910442
DATED : February 28, 2023
INVENTOR(S) : Joseph Gordon et al.

It is certified that error appears in the above-identified patent and that said Letters Patent is hereby corrected as shown below:

In the Claims

Column 18
Line 40, in Claim 30, after "method" insert -- of --

Signed and Sealed this
Eleventh Day of April, 2023

*Katherine Kelly Vidal*

Katherine Kelly Vidal
*Director of the United States Patent and Trademark Office*